United States Patent [19]
Breteler et al.

[11] 3,973,809
[45] Aug. 10, 1976

[54] AXIAL BALL BEARING AND HOUSING

[76] Inventors: Hendrik Gehardus Franciscus Breteler, prinule Staraat fr., Dedemsvaart; Hendrik Prins, Zwalse wet 157, Balkbrug, both of Netherlands

[22] Filed: Feb. 20, 1975

[21] Appl. No.: 551,342

Related U.S. Application Data

[63] Continuation of Ser. No. 351,785, April 16, 1973, abandoned.

[30] Foreign Application Priority Data

Apr. 17, 1972 Netherlands .................... 7205122

[52] U.S. Cl. .................................................. 308/6 C
[51] Int. Cl.² ........................................... F16C 29/06
[58] Field of Search ............ 308/6 R, 6 A, 6 B, 6 C

[56] References Cited
UNITED STATES PATENTS

| | | | |
|---|---|---|---|
| 2,576,269 | 11/1951 | Thomson | 308/6 C |
| 3,464,745 | 9/1969 | Schaeffler | 308/6 C |

*Primary Examiner*—M. H. Wood, Jr.
*Assistant Examiner*—Gene A. Church
*Attorney, Agent, or Firm*—Albert C. Johnston

[57] ABSTRACT

An axial ball bearing is constituted by a housing block having a bore therethrough containing a ball cage which coacts with axial grooves formed in the wall of the bore to define a plurality of endless ball channels each of which is filled with a series of bearing balls that protrude inwardly from inner axial portions of the channels to provide ball surfaces to support a shaft and protrude outwardly from outer axial portions of the channels into the housing grooves so as to prevent turning of the cage relative to the housing. The ball surfaces define a precisely located bearing surface of cylindrical outline to receive said shaft, the diameter of which is determined solely by the diameter of the bore wall and the diameter of the bearing balls. The housing block, which forms a unit with the cage, itself sustains the load on the bearings and is formed with at least one flat external surface for mounting the bearing in working position.

7 Claims, 4 Drawing Figures

3,973,809

AXIAL BALL BEARING AND HOUSING

This application is a continuation of copending U.S. application Ser. No. 351,785, filed Apr. 16, 1973, now abandoned.

This invention relates to improvements in an axial ball bearing of the type in which in the axial direction at the inside of the bore parallel rows of balls are situated, said balls being arranged in an endless channel so as to freewheel the balls back to the bore after they have reached the end of the supporting part or cage.

Heretofore, for this type of axial support, a ball bearing was used of which the outer as well as inner wall shape is cylindrical. In the inside wall are long axial narrow furrows or grooves uniformly distributed over the surface, the balls being movable in them by rolling in an axial direction and being guided back freewheeling between the inner and outer walls. The balls have a supporting function during their passage through the axial grooves on one side and along the cylindrical surface of the shaft on the other side. The guidance between the walls is obtained by fixation of the inside wall in a certain position with respect to the outer wall, with the help of locking rings positioned at each of both ends.

For these well known ball bearings one always needs separate receiving devices. The disadvantages thereof is that the radial clearance of the shaft in such a bearing is also dependent on the fitting of the ball bearing in the receiving device.

It is an object of the invention to provide a ball bearing which avoids the problem of fitting the bearing into a receiving device, such as a housing, said fitting nearly always being done, in the known practice, by another working shop which, normally, is not meant nor set up for precision work needed in ball bearings.

It is also an object of the invention to provide a ball bearing which is not arranged in a cylindrical, tube-like device that must be fitted into a housing before its functioning.

The invention further provides a ball bearing of which the clearance from the suspended shaft depends only on the precision of the bore and ball bearing therein as such, and not on the precision of other parts of the supporting assembly. Still further the invention provides a ball bearing which can be assembled into its working position without the help of skilled precision labor.

Moreover, the invention provides a ball bearing construction in which the balls not only serve to support the shaft but also act to fix the position of the ball bearing part and more especially to prevent twisting of the ball bearing device, such as a ball bearing cage.

These objects are attained according to the invention by the provision of a ball bearing in a housing block which forms the bore of and sustains the load on the bearing and in which endless channels for the movement of the balls in and out of contact with the supported shaft are each built up of two substantially parallel channel portions connected by curved channel portions at each end, said channels being situated partly in the guiding device or cage and in the housing, so that each channel when filled with balls can act at the same time as a locking device to keep the parts in the locking device and in the housing substantially and mutually in a fixed position.

The housing serving at the same time as a ball bearing device is also provided with at least one flat external surface carrying, if desired, holes or other means for assembling the ball bearing into the desired machine part.

In the above-mentioned way an axial bearing device is obtained that can be assembled directly in a large number of constructions so that the manufacture of special receiving devices, such as a separate housing, is no longer needed. With equal shaft diameter and carrying capacity one may use at least some 20% smaller sizes than with the known bearing devices.

The clearance, positive or negative, between the shaft of cured steel and the bore of the bearing block is determined by the manufacture of the precision work, i.e., the manufacturer of the block bore and axial ball bearing.

As was noted already, for the use of the known ball bearings the clearance is also dependent on the fitting into the receiving device which is normally made and installed by other manufacturers. The absence of a separate housing reduces very much the chance that as a result of inacceptable deviations the life of the bearing is shortened. One also has a savings in manufacturing costs of the whole. In the mounting surface may be fastening holes whereas strippers around the shaft of hardened steel can be installed directly in the bearing block, making it also possible to provide oil bath lubrication in the bearing itself according to the invention.

In many cases it is advantageous to choose a rectangular shape for the housing, so that the whole has the shape of a box. It does not matter then in which position the bearing is to function. This may be horizontal, perpendicular or also slanted.

The invention is elucidated below by reference to the accompanying drawings which illustrate one of the ways of applying the invention, and in which.

Figure 1:
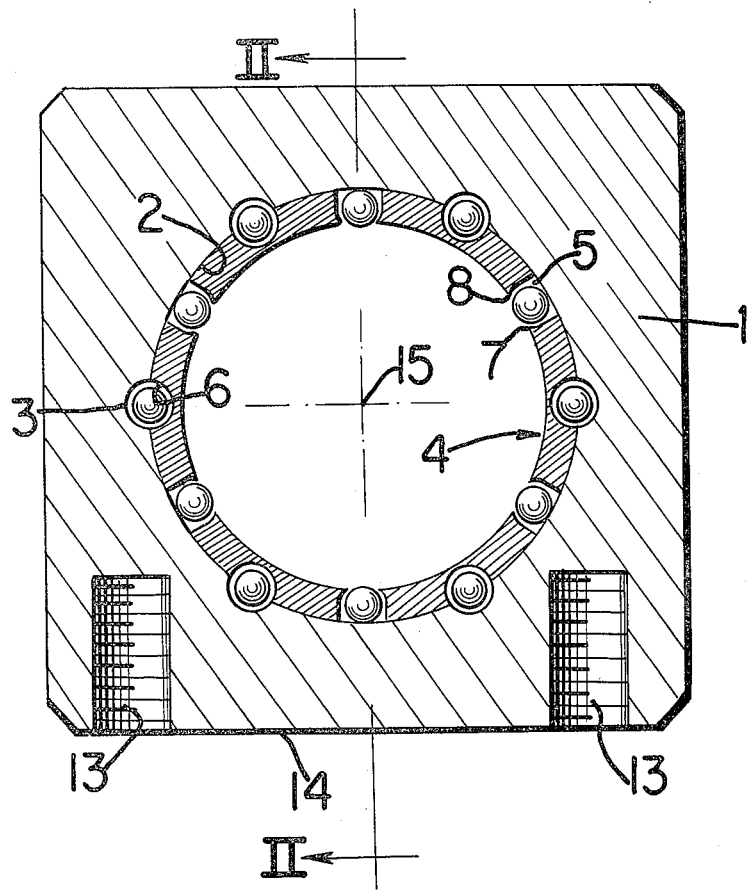
FIG. 1 is a cross-section through an axial bearing block.

In the cross-section of an axial bearing according to the invention, as shown in FIG. 1, a relatively massive metal housing block 1 is provided with a cylindrical bore 2 to surround a shaft, and the wall of the bore has a plurality of grooves or channels 3 formed in it and extending parallel to its axis. A cylindrical ball guiding cage 4, preferably made of brass or a plastic material, is fitted in the bore 2 and coacts with the wall of the bore, including the grooves 3, to provide six endless ball channels each of which is filled with a series of bearing balls. An inner axial portion 5 of each channel opens inwardly through the inner side of the cage 4, and an outer axial portion 6 of the channels opens outwardly through the outer side of the cage in alignment with one of the grooves 3.

Figure 2:
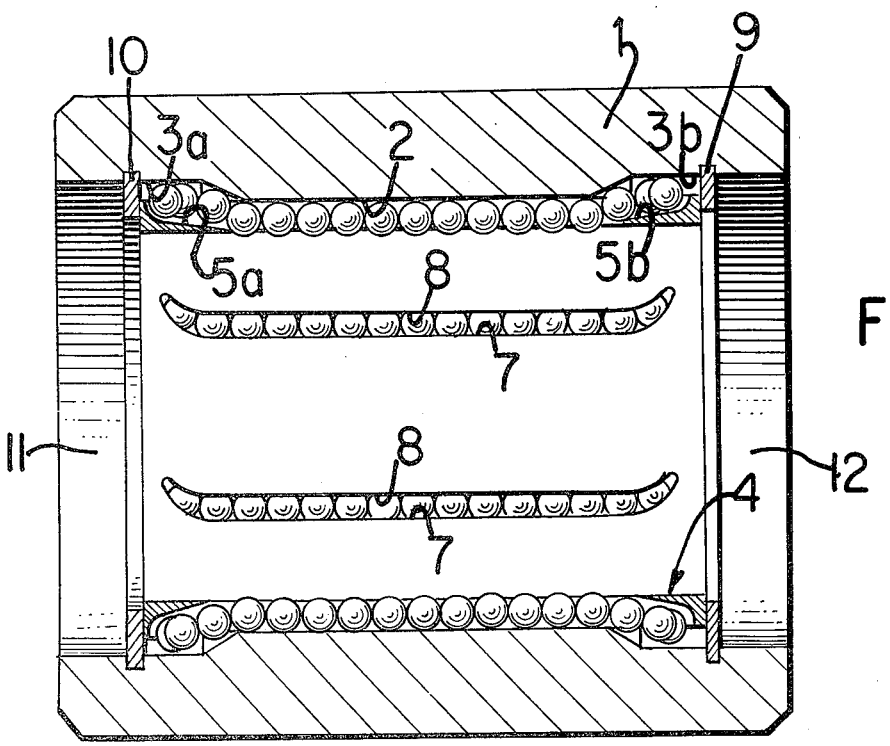
FIG. 2 is a longitudinal section along the line II—II in FIG. 1.
Figure 3:
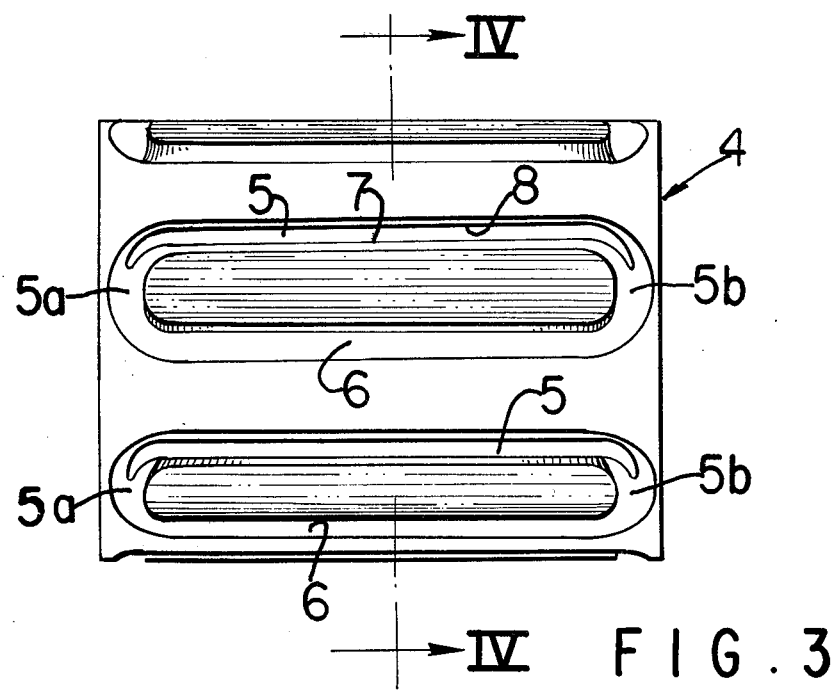
FIG. 3 is a side elevation of a cage or guiding device for balls.

The course of the endless ball channels is shown in FIG. 3, a side elevational view of the ball cage or guiding device 4. The inner axial portions 5 of the channels are formed with inner edges 7 and 8 which are spaced apart sufficiently closely to prevent the balls from falling out of them, yet between which the balls protrude inwardly so as to support a shaft fitted in the bearing. The relationship of the balls to the inner channel portions is also clearly shown in the longitudinal section of FIG. 2.

The inner axial portions 5 lead at their ends into outwardly sloped arcuate end grooves 5a and 5b which are formed in the cage 4 so as to lie opposite to recessed cylindrical surfaces 3a and 3b presented by the wall of the bore at the ends of the grooves 3. These recessed surfaces merge with the bottoms of the grooves 3 and are confronted by the arcuate end grooves 5a and 5b of the ball cage, which thus define curved end portion of the channels through which the balls in each channel can roll freely from the inner axial portion 5 to the outer axial portion 6 and then back into the inner axial portion of the channel.

Figure 4:
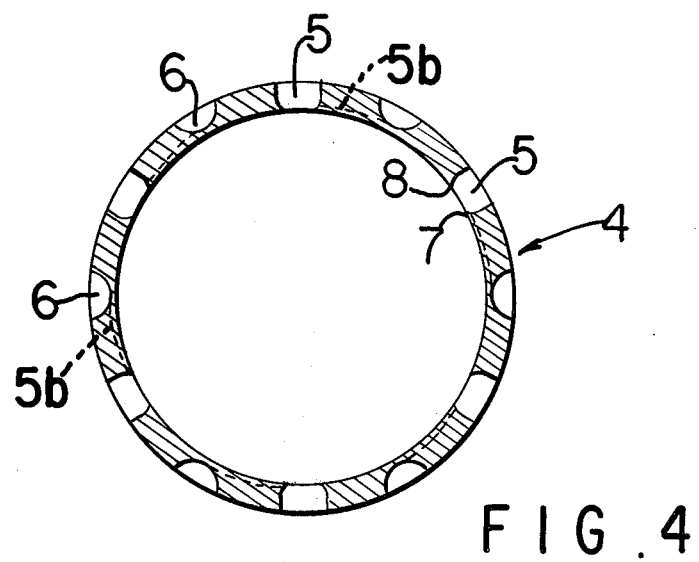
FIG. 4 is a cross-section along the line IV—IV— in FIG. 3.

The relative radial positions of the inner and outer axial portions of the ball channels are shown in FIG. 4, as well as in the assembly view of FIG. 1. The cross-section of each inner portion 5 extends through the inner side of the cage so that the inner edges 7 and 8 prevent the balls from falling out. A substantial part, for example about one-half, of the cross-section of each outer channel portion 6 is formed in and opens outwardly from the outer side of the ball cage so that each outer portion 6 together with one of the grooves 3 forms a closed passageway for the free-wheeling return part of the circuit of the balls in the channel.

As shown in FIG. 2, retaining rings 9 and 10 are set in annular grooves formed in the recessed surfaces 3a and 3b of the bore wall at the ends of the cage 4. These rings prevent the cage from slipping out of the housing block. The balls filling the outer axial portions 6 of the channels prevent the cage from turning in the bore of the block.

The recessed wall portions of the bore are provided with extensions 11 and 12 at the ends of the housing block to receive dirt strippers, or packing rings.

The housing block 1 as shown in FIG. 1 is made with a box-like rectangular external shape. In this embodiment, it is substantially square in cross-sectional outline. The housing block thus presents four substantially flat outer surfaces which lie precisely parallel to, and also at equal distances from, the axis 15 of the bearing bore. Any one of these surfaces, for instance the lower surface 14 as seen in FIG. 1, will provide a precisely aligned mounting surface for the bearing. The block 1 is formed with threaded bores 13 extending thereinto through surface 14 to receive elements such as screws for fastening the bearing in working position.

What we claim is:

1. An axial ball bearing comprising a housing block having a cylindrical bore extending therethrough for receiving a shaft, said block being a solid metal body sufficiently massive to sustain the load of said shaft and preformed with a flat external mounting surface precisely located relative to the axis of said bore and constituting means for positioning said block on a support surface in position to receive said shaft, a plurality of grooves spaced circumferentially and extending axially in the bore wall and bottomed in the metal of said block, a cylindrical ball cage fitted within said bore, said cage and said wall defining a plurality of endless channels each of which contains a series of bearing balls, each of said channels comprising an iner axial channel portion opening inwardly from said cage and from which balls seated on said bore wall protrude to provide ball surfaces for supporting said shaft and an outer axial channel portion opening outwardly from said cage and from which balls protrude into one of said grooves so as to roll therein axially of said cage yet to prevent relative rotation between said cage and said block, said ball surfaces defining a precisely located bearing surface of cylindrical outline to receive said shaft, the diameter of which is determined solely by the diameter of said bore wall and the diameter of said balls, said block constituting the sole housing of the bearing and, when positioned through said mounting surface, constituting the entire load sustaining structure thereof.

2. An axial ball bearing according to claim 1, the wall of said bore presenting recessed cylindrical surfaces located at the ends and merging with the bottoms of said grooves, each of said channels further comprising sloped arcuate end grooves formed in said cage and interconnecting the ends of said inner and outer axial portions of the respective channel and confronting said recessed surfaces so as to define curved end portions of the respective channel.

3. An axial ball bearing according to claim 2, said recessed surfaces each having an annular groove formed therein adjacent to an end of said cage, with a ring fitted into said annular groove to hold said cage in place within said bore, and each said recessed surface having an extension thereof located between said ring and an end of said bore to support means for stripping dirt from the shaft working in the bearing.

4. An axial ball bearing according to claim 1, the wall of said bore presenting recessed cylindrical surfaces located at the ends and merging with the bottoms of said grooves, each of said channels further comprising sloped arcuate end grooves formed in said cage and interconnecting the ends of said inner and outer axial portions of the respective channel and confronting said recessed surfaces so as to define curved end portions of the respective channel, said recessed surfaces each having an annular groove formed therein adjacent to an end of said cage, with a ring fitted into said annular groove to hold said cage in place within said bore, and each said recessed surface having an extension thereof located between said ring and an end of said bore to support means for stripping dirt from the shaft working in the bearing.

5. An axial ball bearing according to claim 1, said mounting surface being a flat surface located precisely parallel to the axis of said bore and having bores extending therethrough into said body to receive elements for fastening the bearing in working position.

6. A housing block for an axial ball bearing consisting essentially of a solid metal body having a cylindrical bore extending therethrough for receiving a shaft and being sufficiently massive to sustain the load of said shaft, said body being preformed with a flat external mounting surface precisely located relative to the axis of said bore and constituting means for positioning said body on a support surface in position to receive said shaft, said bore being bounded by an even cylindrical wall surface of said body having formed therein and bottomed in the metal of said body a series of grooves extending axially therealong to receive loosely portions of bearing balls rollable in said grooves, said body constituting the sole housing for the bearing and, when positioned through said mounting surface, constituting the entire load sustaining structure thereof.

7. A housing block according to claim 6, said mounting surface being a flat surface located precisely parallel to the axis of said bore and having bores extending therethrough into said body to receive elements for fastening the housing block in working position.

* * * * *